United States Patent [19]
Castellano

[11] Patent Number: 6,091,326
[45] Date of Patent: Jul. 18, 2000

[54] DEVICE FOR REMINDING A DRIVER OF A VEHICLE OF DATES SPECIFIC TO THE VEHICLE

[76] Inventor: Antonio Castellano, 272 B136 St., Rockaway, N.Y. 11694

[21] Appl. No.: 09/320,289

[22] Filed: May 26, 1999

[51] Int. Cl.[7] .................................................. B60Q 1/00
[52] U.S. Cl. ...................... 340/457.4; 340/309.15; 340/457; 340/571; 340/572; 368/10; 368/278
[58] Field of Search ............................... 340/457.4, 457, 340/691.6, 692, 693.5, 693.9, 309.15, 457.2, 571, 572

[56] References Cited

U.S. PATENT DOCUMENTS

| | | | |
|---|---|---|---|
| 3,940,735 | 2/1976 | Kronenberg | 340/52 D |
| 4,159,531 | 6/1979 | McGrath | 364/900 |
| 4,302,752 | 11/1981 | Weitzler | 340/309.1 |
| 4,525,782 | 6/1985 | Wohlfarth et al. | 364/431.01 |
| 4,593,263 | 6/1986 | Peckworth | 340/52 D |
| 4,630,027 | 12/1986 | Muhlberger et al. | 340/52 F |
| 4,839,749 | 6/1989 | Franklin | 360/12 |
| 4,868,800 | 9/1989 | Arber | 368/29 |
| 5,199,009 | 3/1993 | Svast | 368/240 |
| 5,327,115 | 7/1994 | Swierczek | 340/309 |
| 5,705,977 | 1/1998 | Jones | 340/457.2 |
| 5,917,408 | 6/1999 | Cardillo et al. | 340/439 |

Primary Examiner—Jeffery A. Hofsass
Assistant Examiner—Hung Nguyen
Attorney, Agent, or Firm—Richard L. Miller, P.E.

[57] ABSTRACT

A device for reminding a driver of a vehicle of the expiration date of the associated inspection sticker. The device includes a housing, a microprocessor, a LCD, a calendar chip for generating a date, a clock chip for generating a time, an alarm chip the provides a visible alarm and an audible alarm, a select button that selects either the clock chip, the calendar chip, or the alarm chip, and a value button that sets either the clock chip, the calendar chip, or the alarm chip that was selected by the select button. The device further includes a piece of two-sided tape that is attached to the rear wall of the housing and attaches the housing to the windshield of the vehicle, behind the inspection sticker. The audible and visible alarms have duty cycles with frequencies and durations that are selected by a menu brought up on the LCD display by the select button and set by the value button. The duty cycles are intermittent as opposed to constant for preventing drain on the battery. The alarm chip is set to activate at a predetermined time prior to the expiration date of the inspection sticker so as to remind the driver of the vehicle that the expiration date of the inspection sticker is approaching.

12 Claims, 2 Drawing Sheets

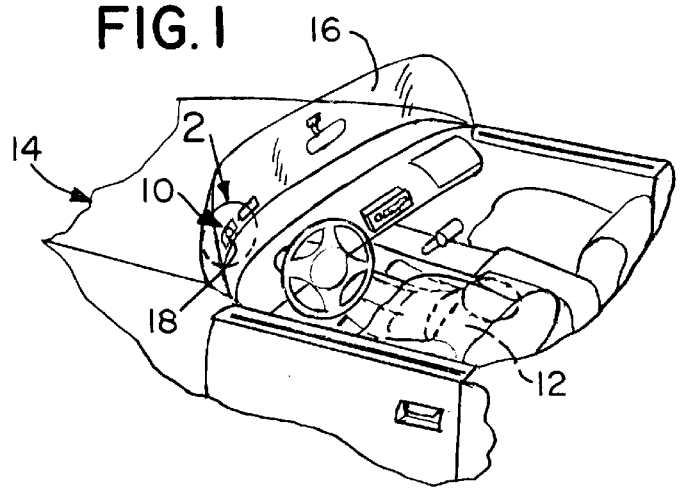
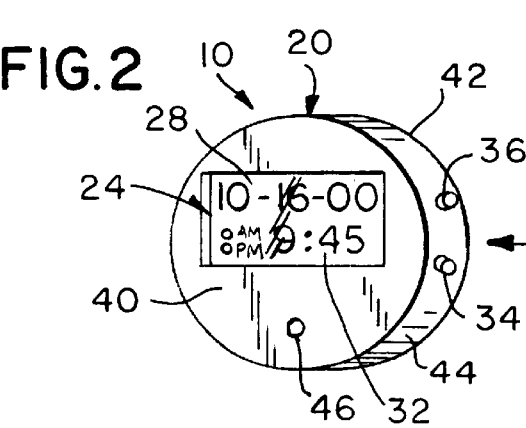
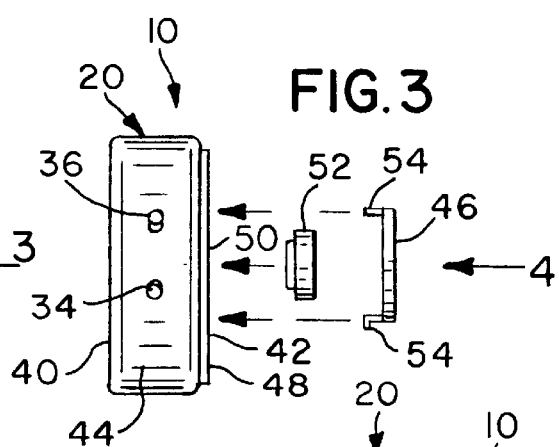
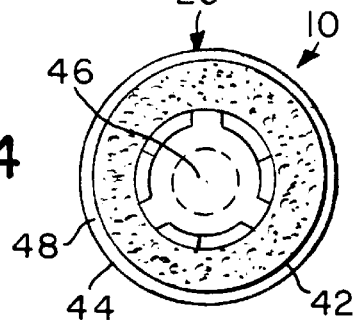
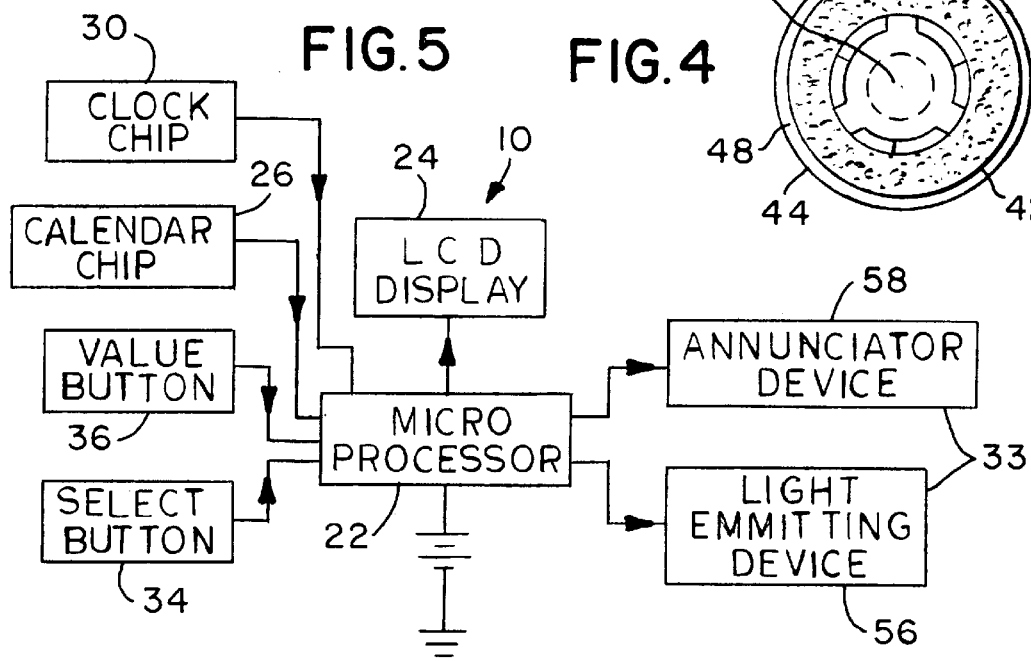

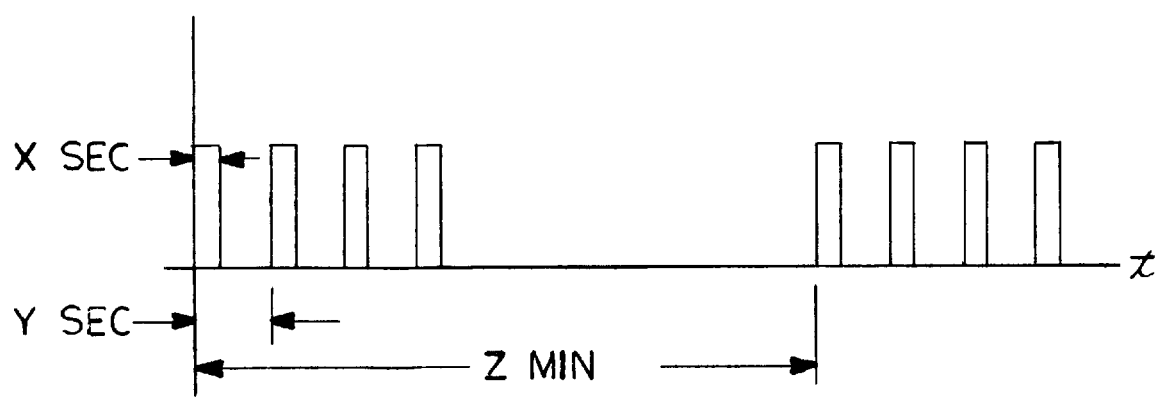

6,091,326

DEVICE FOR REMINDING A DRIVER OF A VEHICLE OF DATES SPECIFIC TO THE VEHICLE

BACKGROUND OF THE INVENTION

1. Field of the Invention

The present invention relates to a device for reminding a driver of a vehicle of dates. More particularly, the present invention relates to a device for reminding a driver of a vehicle of dates specific to the vehicle.

2. Description of the Prior Art

Numerous innovations for reminding devices have been provided in the prior art that will be described. Even though these innovations may be suitable for the specific individual purposes to which they address, however, they differ from the present invention.

A FIRST EXAMPLE, U.S. Pat. No. 4,839,749 to Franklin teaches a vehicle safety and personal message system primarily designed to be incorporated into a vehicle to provide the driver with a pre-recorded speech message pertaining to either a vehicle safety alert or a personal message. The safety alerts include. events as: door ajar, burglar alarm ON or OFF, speed limit exceeded and a fire/police siren detector. The personalized messages includes reminders such as birth dates, anniversaries, meeting date/time and scheduled maintenance periods. All the messages can be recorded in any language and in any local or ethnic jargon and the personal messages may be programmed to occur at anytime within a one-year period. Although the system's primary usage is for vehicles, it can also be adapted for use on many other products that utilize short messages. These products includes robotics, ATM machines, telephone answering machines, fire detection devices, toys and numerous other consumer oriented products.

A SECOND EXAMPLE, U.S. Pat. No. 4,868,800 to Arber teaches an electronic advanced date warning system including a base having a front surface, a first member associated with the front surface for lighting selected date warning areas thereon, a second member associated with the front surface for lighting selected areas thereon corresponding to specific categories of events associated with the selected date warning areas of the first member, and a member for selectively activating and deactivating both of the first and second lighting members to provide the advanced date warnings and associated event indicators. The system can include an enlarged front surface exhibiting conventional calendar information indicia that can be used in conjunction with the first member.

A THIRD EXAMPLE, U.S. Pat. No. 5,199,009 to Svast teaches a programmable clock that includes a memory for storing times, dates and messages for subsequent read-out and display in providing a reminder of a birthday, anniversary, doctor's appointment, meeting, etc. The clock is adapted for prominent display by mounting to a wall or other support structure and provides a user with a visual display of stored reminder messages, as well as an indication of the content of the reminder message, over a given future time period, i.e., all stored reminder messages for today, tomorrow, or some other selected day in the future. The reminder clock also includes a speaker and an audio recorder for providing a reminder message in the user's owner voice, as well as a printer for providing more extensive reminder messages as well as a list of all stored reminder messages. The reminder clock makes use of any one of several analog and combined analog and digital time displays which are easily read and understood, including a display presenting an analog representation of hours and a digital display of minutes. Various audio and/or video alarms are provided to indicate the read-out and display of a reminder message. An electronic pendulum is provided to indicate proper operation of the reminder clock as is a calendar indicating the days and times when stored reminder messages are to be recalled from memory and displayed.

A FOURTH EXAMPLE, U.S. Pat. No. 5,327,115 to Swierczek teaches a device for keeping track of critical dates relative to a specific file or collection of papers and alerting the responsible individual as to the same. The device consists essentially of a programmable timer unit having a LCD screen and/or alarm mechanism coupled with a means for physical attachment to a document or folder.

A FIFTH EXAMPLE, U.S. Pat. No. 5,705,977 to Jones teaches a maintenance scheduling device having a face plate with a front surface providing a plurality of aligned maintenance item description labels, a plurality of recommended interval description labels, a plurality of aligned numeral wheel assemblies for displaying last service maintenance and a plurality of aligned numeral wheel assemblies for displaying next service maintenance. The device may also include a programmable electrical signal processor interconnected with a power source, can odometer of the vehicle, and a memory device containing recommended maintenance mileage information for each maintenance item, the processor serving to signal a user when a recommended service interval has elapsed on the mileage recorded on the odometer. The device opens to reveal a set of maintenance guide charts for the vehicle of choice.

It is apparent that numerous innovations for reminding devices have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a device for reminding a driver of a vehicle of dates specific to the vehicle that avoids the disadvantages of the prior art.

ANOTHER OBJECT of the present invention is to provide a device for reminding a driver of a vehicle of dates specific to the vehicle that is simple and inexpensive to manufacture.

STILL ANOTHER OBJECT of the present invention is to provide a device for reminding a driver of a vehicle of dates specific to the vehicle that is simple to use.

BRIEFLY STATED, YET ANOTHER OBJECT of the present invention is to provide a device for reminding a driver of a vehicle of the expiration date of the associated inspection sticker. The device includes a housing, a microprocessor, a LCD, a calendar chip for generating a date, a clock chip for generating a time, an alarm chip the provides a visible alarm and an audible alarm, a select button that selects either the clock chip, the calendar chip, or the alarm chip, and a value button that sets either the clock chip, the calendar chip, or the alarm chip that was selected by the select button. The device further includes a piece of two-sided tape that is attached to the rear wall of the housing and attaches the housing to the windshield of the vehicle, behind the inspection sticker. The audible and visible alarms have duty cycles with frequencies and durations that are selected by a menu brought up on the LCD display by the select button and set by the value button. The duty cycles are intermittent as opposed to constant for preventing drain on the battery. The alarm chip is set to activate at a predetermined time prior to the expiration date of the inspection sticker so as to remind the driver of the vehicle that the expiration date of the inspection sticker is approaching.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows:

FIG. 1 is a diagrammatic perspective view of the present invention in use;

FIG. 2 is an enlarged diagrammatic perspective view of the area generally enclosed in the dotted curve identified by arrow 2 in FIG. 1 of the present invention;

FIG. 3 is a diagrammatic side elevational view taken generally in the direction of arrow 3 in FIG. 2;

FIG. 4 is a diagrammatic rear elevational view taken generally in the direction of arrow 4 in FIG. 3;

FIG. 5 is a block diagram of the present invention; and

FIG. 6 is a timing diagram for the alarm of the present invention.

LIST OF REFERENCE NUMERALS UTILIZED IN THE DRAWING 10 device for reminding a driver of a vehicle of dates specific to the vehicle of the present invention
12 driver of vehicle 14
14 vehicle
16 windshield of vehicle 14
18 inspection sticker on windshield 16 of vehicle 14
20 housing
22 microprocessor
24 LCD display
26 calendar chip
28 date
30 clock chip
32 time
33 alarm chip
34 select button
36 value button
40 front wall of housing 20
42 rear wall of housing 20
44 longitudinal wall of housing 20
46 access cap in rear wall 42 of housing 20
48 ring around access cap 46 in rear wall 42 of housing 20
50 access in rear wall 42 of housing 20 for replacing battery 52
52 battery
54 plurality of resilient feet extending from replaceable access cap 46
56 LED of visible alarm of alarm chip 33
58 sound chip of audible alarm of alarm chip 33
60 piece of two-sided tape for attaching housing 20 to windshield 16 of vehicle 14

DETAILED DESCRIPTION OF THE PREFERRED EMBODIMENT

Referring now to the figures, in which like numerals indicate like parts, and particularly to FIG. 1, the device for reminding a driver of a vehicle of dates specific to the vehicle of the present invention is shown generally at 10 for reminding a driver 12 of a vehicle 14 having a windshield 16 with an inspection sticker 18 thereon having an expiration date of the expiration date of the inspection sticker 18.

The configuration of the device for reminding a driver of a vehicle of dates specific to the vehicle 10 can best be seen in FIGS. 2–5, and as such, will be discussed with reference thereto.

The device for reminding a driver of a vehicle of dates specific to the vehicle 10 comprises a housing 20, a microprocessor 22 contained in the housing 20, a LCD 24 electrically communicating with the microprocessor 22 and being visible through the housing 20, a calendar chip 26 contained in the housing 20 and electrically communicating with the microprocessor 22 and displaying a date 28 by way of the LCD display 24, a clock chip 30 contained in the housing 20 and electrically communicating with the microprocessor 22 and displaying a time 32 by way of the LCD display 24, an alarm chip 33 contained in the housing 20 and electrically communicating with the microprocessor, a select button 34 extending outwardly from the housing 20 and electrically communicating with the microprocessor 22 and selecting one of the clock chip 26, the calendar chip 30, and the alarm chip 33, and a value button 36 extending outwardly from the housing 20 and electrically communicating with the microprocessor 22 and setting one of the clock chip 26, the calendar chip 30, and the alarm chip 33 selected by the select button 34.

The housing 20 is disk-shaped and has a front wall 40 that is circular, a rear wall 42 that is circular, and a longitudinal wall 44 that is cylindrically-shaped and extends from the front wall 40 thereof to the rear wall 42 thereof.

The rear wall 42 of the housing 20 contains a replaceable access cap 46 that is circular-shaped and concentrically disposed thereon so as to allow formation of a ring 48 therearound, and when removed, provides an access 50 in the rear wall 42 of the housing 20 for replacing a battery 52.

The replaceable access cap 46 has a plurality of resilient feet 54 that extend therefrom and engage in the housing 20, through the access 50 therein so as to allow replaceable maintenance of the replaceable access cap 46 in the rear wall 42 of the housing 20.

The LCD display 24 is disposed on the front wall 40 of the housing 20.

The select button 34 is a push button that extends outwardly from the longitudinal wall 44 of the housing 20.

The value button 36 is a push button that extends outwardly from the longitudinal wall 44 of the housing 20, adjacent the select button 34.

The alarm chip 33 provides an audible and a visible alarm.

The visible alarm is provided by an LED 56 that is disposed on the front wall 40 of the housing 20 and is in electrical communication with the microprocessor 22.

The audible alarm is provided by a sound chip 58 that is contained in the housing 20 and is in electrical communication with the microprocessor 22.

The audible and visible alarm have duty cycles with frequencies and durations that are selected by a menu brought up on the LCD display 24 by the select button 34 and set by the value button 36.

As shown in FIG. 6, the duty cycles are intermittent as opposed to constant for preventing drain on the battery 52. For example, a set of four individual bursts of X second duration, with each burst in the set separated from another burst in the set by a Y second duration, and with each set of four individual bursts separated from another set by a Z minutes duration.

The device for reminding a driver of a vehicle of dates specific to the vehicle 10 further comprises a piece of two-sided tape 60 that is attached to the rear wall 42 of the housing 20 for attaching the housing 20 to the windshield 16 of the vehicle 14, behind the inspection sticker 18, with the alarm chip 33 being set to activate at a predetermined time prior to the expiration date of the inspection sticker 18 so as to remind the driver 12 of the vehicle 14 that the expiration date of the inspection sticker 18 is approaching.

The piece of two-sided tape 60 is ring-shaped to cover only the ring 48 of the rear wall 42 of the housing 20 so as not to interfere with removal of the replaceable access cap 46.

It will be understood that each of the elements described above, or two or more together, may also find a useful application in other types of constructions differing from the types described above.

While the invention has been illustrated and described as embodied in a device for reminding a driver of a vehicle of dates specific to the vehicle, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

What is claimed is:

1. A device for reminding a driver of a vehicle having a windshield with an inspection sticker thereon having an expiration date of the expiration date of the inspection sticker, said device comprising:

a) a housing; said housing being disk-shaped and having:
      i) a front wall that is circular;
      ii) a rear wall that is circular; and
      iii) a longitudinal wall that is cylindrically-shaped and extends from said front wall thereof to said rear wall thereof;
   b) a microprocessor contained in said housing;
   c) a LCD display electrically communicating with said microprocessor and being visible through said housing;
   d) a calendar chip contained in said housing and electrically communicating with said microprocessor and displaying a date by way of said LCD display;
   e) a clock chip contained in said housing and electrically communicating with said microprocessor and displaying a time by way of said LCD display;
   f) an alarm chip contained in said housing and electrically communicating with said microprocessor; said alarm chip being set to activate at a predetermined time prior to the expiration date of the inspection sticker so as to remind a driver of the vehicle that the expiration date of the inspection sticker is approaching; said alarm chip providing an audible and a visible alarm;
   g) a select button extending outwardly from said housing and electrically communicating with said microprocessor and selecting one of said clock chip, said calendar chip, and said alarm chip; and
   h) a value button extending outwardly from said housing and electrically communicating with said microprocessor and setting one of said clock chip, said calendar chip, and said alarm chip selected by said select button; said audible and visible alarm having duty cycles with frequencies and durations selected by a menu brought up on said LCD display by said select button and set by said value button.

2. The device as defined in claim 1, wherein said rear wall of said housing contains a replaceable access cap that is circular-shaped and concentrically disposed thereon so as to allow formation of a ring therearound, and when removed, provides an access in said rear wall of said housing for replacing a battery.

3. The device as defined in claim 2, wherein said replaceable access cap has a plurality of resilient feet that extend therefrom and engage in said housing, through said access therein so as to allow replaceable maintenance of said replaceable access cap in said rear wall of said housing.

4. The device as defined in claim 2; further comprising a piece of two-sided tape that is attached to said rear wall of said housing for attaching said housing to the windshield of the vehicle, behind the inspection sticker, with said alarm chip being set to activate at a predetermined time prior to the expiration date of the inspection sticker so as to remind the driver of the vehicle that the expiration date of the inspection sticker is approaching.

5. The device as defined in claim 4, wherein said piece of two-sided tape is ring-shaped to cover only said ring of said rear wall of said housing so as not to interfere with removal of said replaceable access cap.

6. The device as defined in claim 1, wherein said LCD display is disposed on said front wall of said housing.

7. The device as defined in claim 1, wherein said select button is a push button that extends outwardly from said longitudinal wall of said housing.

8. The device as defined in claim 7, wherein said value button is a push button that extends outwardly from said longitudinal wall of said housing, adjacent said select button.

9. The device as defined in claim 1, wherein said visible alarm is provided by an LED that is disposed on said front wall of said housing and is in electrical communication with said microprocessor.

10. The device as defined in claim 1, wherein said audible alarm is provided by a sound chip that is contained in said housing and is in electrical communication with said microprocessor.

11. The device as defined in claim 1, wherein said duty cycles are intermittent as opposed to constant for preventing drain on the battery.

12. The device as defined in claim 11, wherein said duty cycles include a set of four individual bursts of X second duration, with each burst in said set separated from another burst in said set by a Y second duration, and with each said set of four individual bursts separated from another said set by a Z second duration.

* * * * *